(12) United States Patent
Nishimura (10) Patent No.: US 7,692,575 B2
(45) Date of Patent: Apr. 6, 2010

(54) RADAR TARGET DETECTION METHOD AND RADAR APPARATUS USING THE SAME

(75) Inventor: Tetsu Nishimura, Toyonaka (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 341 days.

(21) Appl. No.: 11/877,765

(22) Filed: Oct. 24, 2007

(65) Prior Publication Data

US 2008/0100499 A1 May 1, 2008

(30) Foreign Application Priority Data

Oct. 31, 2006 (JP) .............................. 2006-295702
Aug. 29, 2007 (JP) .............................. 2007-222112

(51) Int. Cl.
G01S 13/06 (2006.01)
G01S 13/32 (2006.01)
G01S 7/35 (2006.01)
G01S 13/93 (2006.01)
G01S 13/00 (2006.01)

(52) U.S. Cl. .......................... 342/147; 342/27; 342/70; 342/118; 342/128; 342/146; 342/175; 342/189; 342/192; 342/193; 342/195; 342/196

(58) Field of Classification Search .................. 342/27, 342/28, 70–72, 104–116, 118, 128–133, 342/146–158, 175, 189–197, 134, 135, 139–145; 701/300, 301
See application file for complete search history.

(56) References Cited

U.S. PATENT DOCUMENTS

| | | | | |
|---|---|---|---|---|
| 2,508,400 A | * | 5/1950 | Kiebert, Jr. | 342/133 |
| 3,568,188 A | * | 3/1971 | Fishbein et al. | 342/109 |
| 4,151,525 A | * | 4/1979 | Strauch et al. | 342/139 |
| 5,181,037 A | * | 1/1993 | Komatsu | 342/70 |
| 5,229,774 A | * | 7/1993 | Komatsu | 342/70 |
| 5,361,072 A | * | 11/1994 | Barrick et al. | 342/133 |
| 5,731,778 A | * | 3/1998 | Nakatani et al. | 342/70 |
| 5,751,240 A | * | 5/1998 | Fujita et al. | 342/70 |
| 5,982,321 A | * | 11/1999 | Iihoshi et al. | 342/158 |
| 6,072,422 A | * | 6/2000 | Yamada | 342/70 |
| 6,121,917 A | * | 9/2000 | Yamada | 342/128 |
| 6,140,954 A | * | 10/2000 | Sugawara et al. | 342/70 |
| 6,204,803 B1 | * | 3/2001 | Uehara | 342/70 |
| 6,229,474 B1 | * | 5/2001 | Uehara | 342/70 |
| 6,246,357 B1 | * | 6/2001 | Uehara | 342/70 |

(Continued)

FOREIGN PATENT DOCUMENTS

JP    08-327731    12/1996

(Continued)

Primary Examiner—Bernarr E Gregory
(74) Attorney, Agent, or Firm—Dickstein Shapiro LLP (57) ABSTRACT

A radar target detection method in which an azimuth at which a target is located is detected on the basis of reception signals obtained through antenna elements of an array antenna by detecting a change in levels of spectrum peaks in an azimuth spectrum of reception signal intensities, calculating a level of correlation between the level change of each spectrum peak and a directivity pattern of the array antenna in an azimuth range corresponding to the spectrum peak, and determining an azimuth corresponding to one of the spectrum peaks having the highest corresponding correlation level to be the azimuth at which the target is located.

9 Claims, 7 Drawing Sheets

U.S. PATENT DOCUMENTS

| | | | |
|---|---|---|---|
| 6,369,748 B1 * | 4/2002 | Uehara | 342/70 |
| 6,445,339 B1 * | 9/2002 | Yamada | 342/128 |
| 6,563,454 B2 * | 5/2003 | Akasu | 342/130 |
| 6,646,589 B2 * | 11/2003 | Natsume | 342/70 |
| 6,657,582 B2 * | 12/2003 | Seki et al. | 342/70 |
| 6,674,393 B2 * | 1/2004 | Kishida | 342/70 |
| 6,753,805 B2 * | 6/2004 | Nakanishi et al. | 342/128 |
| 6,856,278 B2 * | 2/2005 | Nakanishi et al. | 342/128 |
| 7,123,183 B2 * | 10/2006 | Shouno et al. | 342/70 |
| 7,301,496 B2 * | 11/2007 | Honda et al. | 342/70 |
| 2003/0052813 A1 * | 3/2003 | Natsume | 342/70 |

FOREIGN PATENT DOCUMENTS

| | | |
|---|---|---|
| JP | 11-231040 | 8/1999 |
| JP | 2000-258524 | 9/2000 |
| JP | 2001-228235 | 8/2001 |
| JP | 2005-164370 | 6/2005 |
| WO | WO99/34234 | 7/1999 |

* cited by examiner

RADAR TARGET DETECTION METHOD AND RADAR APPARATUS USING THE SAME

BACKGROUND OF THE INVENTION

1. Field of the Invention

The present invention relates to radar target detection methods, and particularly to a target azimuth detection method and a radar apparatus using the detection method.

2. Description of the Related Art

Various radar apparatuses mounted in front portions of vehicles to detect targets have been developed. Such radar apparatuses transmit transmission waves towards predetermined detection areas including areas extending forward of the vehicles and receive reflection waves reflected from targets located within the detection areas. In a type of radar apparatus which has been in widespread use, at least either a transmitting antenna or a receiving antenna is configured as an array antenna composed of a plurality of antenna elements, and an azimuth of a target is detected on the basis of signals of a beam formed at different azimuths.

Spacing between antenna elements constituting an array antenna may simultaneously constitute an advantage and a disadvantage of a radar apparatus. For example, when a distance between adjacent antenna elements is equal to or less than a half wavelength of a transmission signal, no grating lobes are generated. This allows precise detection of a target azimuth while decreasing the azimuth resolution. On the other hand, when the inter-element spacing is greater than a half wavelength of the transmission signal, an array antenna with a large aperture can be realized with a small number of antenna elements. This permits a radar apparatus to have a high azimuth resolution at low cost while resulting in generation of grating lobes.

To overcome the above disadvantage, several techniques have been developed.

For example, Japanese Unexamined Patent Application Publication No. 11-231040 discloses a radar in which an azimuth at which a directional intensity of a transmission/reception signal in a directivity pattern of an array antenna is null matches an azimuth at which grating lobes are generated.

In addition, a radar disclosed in Japanese Unexamined Patent Application Publication No. 2000-258524 includes a first antenna capable of generating a beam in which intervals between grating lobes are small and a second antenna capable of generating a beam in which intervals between grating lobes are large. In this radar, the first antenna is used for detection of a target located at a distant position, and the second antenna is used for detection of a target located at a near position.

Further, a radar device disclosed in Japanese Unexamined Patent Application Publication No. 2005-164370 utilizes the fact that azimuth angles at which grating lobes are generated depends on a transmission frequency. In this radar device, a transmission frequency is changed so that angles at which grating lobes are generated are changed with time.

SUMMARY OF THE INVENTION

However, angles at which grating lobes are generated depend on an azimuth of a target to be detected. Thus, in implementation of the radar disclosed in Japanese Unexamined Patent Application Publication No. 11-231040, a directivity pattern of the radar may have to be changed for each target to be detected. However, it is difficult to change the directivity pattern as necessary. Thus, this radar is not capable of uniformly suppressing grating lobes regardless of the azimuth of the target.

In addition, the radar disclosed in Japanese Unexamined Patent Application Publication No. 2000-258524 realizes a plurality of antenna patterns by switching a relatively large number of antenna elements using a switch. Thus, in implementation of this radar, a large number of switches may be necessary, which results in high manufacturing cost.

Further, in the radar disclosed in Japanese Unexamined Patent Application Publication No. 2005-164370, a transmission frequency is changed to switch an azimuth at which a grating lobe is generated. However, this radar is difficult to implement in terms of Radio Laws and manufacturing cost.

The present invention has been made in view of the above circumstances. Accordingly, there is a need for a radar target detection method which allows precise detection of a target azimuth through simple processing even under conditions where grating lobes are generated.

According to an embodiment of the present invention, there is provided a radar target detection method in which reception signal intensities at arbitrary specified azimuth angles within a predetermined detection area is calculated, on basis of reception signals obtained from transmitting and receiving of wave through antenna elements of an array antenna, and an azimuth at which a target is located is detected from the reception signal intensities arriving from the specified azimuth angles. This radar target detection method includes the following steps: (1) detecting change in levels of spectrum peaks in an azimuth spectrum of the reception signal intensities; (2) calculating a level of correlation between the level change of each spectrum peak and a directivity pattern of the array antenna in an azimuth range corresponding to the spectrum peak; and (3) determining an azimuth corresponding to one of the spectrum peaks of which the corresponding correlation level is high to be the azimuth at which the target is located.

In this method, an azimuth spectrum of reception signal intensity based on a reception signal is time-sequentially formed, and change in the levels of a plurality of detected spectrum peaks is obtained. Then, a directivity pattern at an azimuth corresponding to each spectrum peak is read so that a level of correlation between the level change of the spectrum peak and a directivity pattern at the corresponding azimuth is detected. Note that the level change of a spectrum peak depends on the azimuth of a target and a directivity pattern. Thus, the level change of a spectrum peak corresponding to an azimuth of the target is similar to change in a directional level in the directivity pattern in a corresponding azimuth range. On the other hand, the level change of a spectrum peak corresponding to an azimuth at which the target is not present, i.e., at which grating lobes are generated, is not similar to change in the directional level in the directivity pattern in a corresponding azimuth range. Therefore, the azimuth at which the target is located can be obtained by detecting an azimuth corresponding to a peak level having a high correlation level with the directivity pattern.

In the radar target detection, when an azimuth corresponding to one of the spectrum peaks changes with time, change in the level of a spectrum peak according to the azimuth change is detected, and the detected spectrum peak level change is approximated using a predetermined function so that a level of correlation between the spectrum peak level change and the directivity pattern is calculated.

According to the method, in the detection of a level of correlation based on the level change of a peak level, the level change is approximated using a predetermined function and compared with a directivity pattern. With this arrangement, variation in the level change due to a factor other than the azimuth of a target and the directivity pattern can be suppressed.

In addition, in the radar target detection method, linear approximation can be applied to a level change.

Specifically, the level change is linearly approximated using a linear function and compared with the directivity pattern. This allows the comparison and the correlation level detection to be performed through simplified operations.

In the radar target detection method, a spectrum peak level is corrected on the basis of a distance calculated from the reception signal.

Specifically, the correction is based on the fact that the intensity of a reception signal depends on a distance of a target. With this arrangement, the relationship between an azimuth and the reception signal intensity is constant regardless of the target distance.

In this method, a plurality of directivity patterns are set, and a level of correlation between change in a directional level due to switching of the directivity patterns and change in a spectrum peak level due to the switching is calculated for each azimuth corresponding to the individual spectrum peaks.

Specifically, a plurality of directivity patterns are set, and the level change of a spectrum peak before and after switching of the individual directivity patterns is obtained. Since change in the directivity pattern causes a change in the directional level at each azimuth, the level change of a spectrum peak corresponding to an azimuth at which the target is present is similar to change in the directional level in the directivity pattern in a corresponding azimuth range. On the other hand, the level change of a spectrum peak corresponding to an azimuth at which the target is not present, i.e., at which grating lobes are generated, is not similar to change in the directional level in the directivity pattern in a corresponding azimuth range. Therefore, the azimuth at which the target is located can be obtained by detecting an azimuth at which the level change of a corresponding spectrum peak has a high level of correlation with corresponding change in the directional level. The directional level at the azimuth of the target is changed due to the switching of the individual directional patterns, and thus, the azimuth of the target can be detected even when no change occurs in the azimuth of the target with respect to a radar.

A radar apparatus according to an embodiment of the present invention includes a transmitting antenna and a receiving antenna, at least either of which is an array antenna composed of a plurality of antenna elements disposed linearly at a predetermined spacing, and a target detecting unit configured to perform the method described above on the basis of a reception signal at the receiving antenna.

In this radar apparatus, an array antenna and a target detecting unit configured to perform the above target azimuth detection are included. Thus, a radar apparatus capable of performing target azimuth detection through simple processing can be realized.

In the radar apparatus, a plurality of antenna elements are disposed with a spacing of at least one half wavelength of a transmission signal.

Sine the inter-element spacing is about one half wavelength of a transmission signal or longer, the azimuth resolution increases while grating lobes are present. Since the above method is performed, it is not likely that an azimuth corresponding to a grating lobe is erroneously selected as the azimuth of a target. Thus, detection of a true azimuth of the target can be realized with precision and simplicity.

The radar apparatus further includes a switching unit configured to mechanically switch the front direction of the array antenna.

With this configuration, directivity patterns are mechanically switched.

According to an embodiment of the present invention, an azimuth at which a target is located can advantageously detected by comparing change in a spectrum peak level and a directivity pattern. This permits detection of the azimuth of the target with certainty even under conditions where grating lobes are generated.

In addition, change in a spectrum peak level is approximated. This enables precise detection of the level change of a spectrum peak as well as the target azimuth.

Further, linear approximation on the level change of a spectrum peak permits detection of the level change through a simple processing and thus realizes rapid detection of the target azimuth.

Moreover, according to an embodiment of the present invention, a spectrum peak level is corrected on the basis of a distance. This enables precise detection of change in the spectrum peak level and realizes reliable detection of a target azimuth.

Furthermore, switching of a plurality of directivity patterns enables accurate detection of the target azimuth even if no change occurs in the target azimuth with respect to the radar.

Other features, elements, characteristics and advantages of the present invention will become more apparent from the following detailed description of preferred embodiments of the present invention with reference to the attached drawings.

DESCRIPTION OF THE PREFERRED EMBODIMENTS

In the following, a radar apparatus and a target detection method using the radar apparatus according to a first embodiment of the present invention will be described with reference to the drawings. In this embodiment, the radar apparatus is assumed to be an FMCW (frequency modulated continuous wave) radar apparatus having a transmitting antenna composed of one antenna element and a receiving antenna composed on a plurality of antenna elements.

Figure 1:
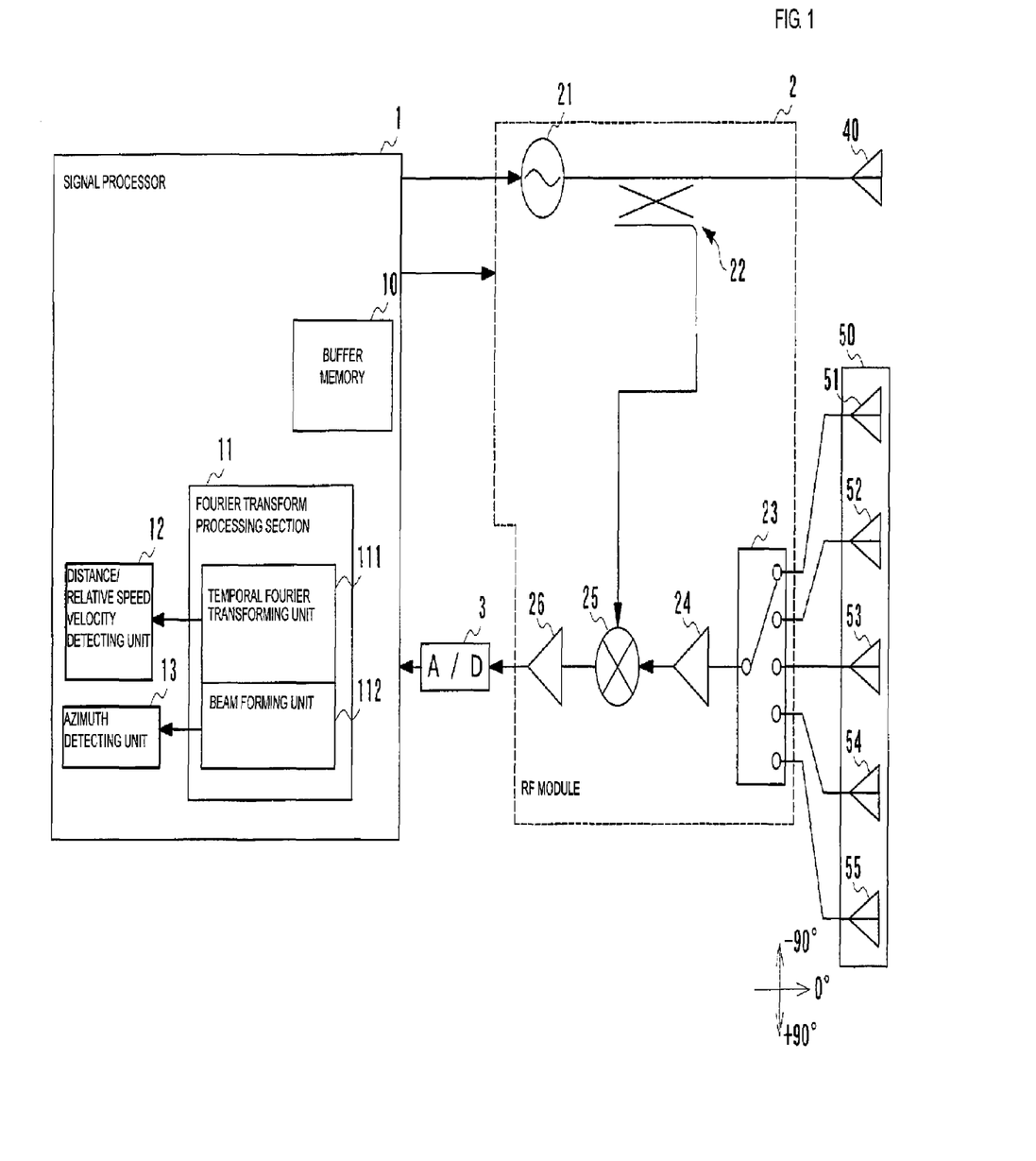
FIG. 1 is a block diagram schematically illustrating a configuration of an FMCW radar apparatus according to an embodiment of the present invention.

FIG. 1 is a block diagram schematically illustrating a configuration of an FMCW radar apparatus according to an embodiment of the present invention.

As illustrated in FIG. 1, the radar apparatus has a signal processor 1 performing transmission signal control, switching control, and object detection, an RF (radio frequency) module 2, a transmitting antenna 40 and a receiving antenna 50.

In control of a transmission system, the signal processor 1 generates a transmission control signal and a switching control signal. The transmission control signal is to be supplied to a VCO (voltage controlled oscillator) 21 of the RF module 2 so that a transmission signal whose frequency is modulated with respect to time to form a triangular waveform (hereinafter referred to as a triangular-wave modulated transmission signal) is generated. The switching control signal is to be supplied to an output switching circuit 23 of the RF module 2 so that each of antenna elements 51 to 55 of the receiving antenna 50 is selected.

The signal processor 1 outputs a transmission control signal so that a triangular-wave modulated part is generated at a predetermined transmission cycle. At the same time, the signal processor 1 outputs a switching control signal for matching the timing of the rising edge of each triangular-wave modulated part and the switching timing of the individual antenna elements 51 to 55, so that the antenna elements 51 to 55 sequentially correspond to the individual triangular-wave modulated parts. At this time, a switching pattern of the antenna elements 51 to 55 is set beforehand. For example, it is possible to set successive measurement phases in which the antenna element 51, the antenna element 52, the antenna element 53, the antenna element 54, and the antenna element 55 are time-sequentially switched. Note that the switching pattern of the antenna elements is not limited to the above pattern and may be set in accordance with apparatus specifications and detection specifications, for example.

The RF module 2 has a transmission circuit including the VCO 21 and a distributor 22 and a reception circuit including an output switcher 23, an RF amplifier 24, a mixer 25, and an IF (intermediate frequency) amplifier 26.

The VCO 21, included in the transmission system of the RF module 2, generates a triangular-wave modulated transmission signal in response to a transmission control signal supplied from the signal processor 1 and outputs the triangular-wave modulated transmission signal to the distributor 22.

The distributor 22 is constituted by a directional coupler, for supplying the triangular-wave modulated transmission signal sent from the VCO 21 to the transmitting antenna 40 and dividing the power of the triangular-wave modulated transmission signal to generate a local signal to be supplied to the mixer 25.

The transmitting antenna 40 may be a single patch antenna or the like and emit a transmission wave, which is obtained through conversion from the triangular-wave modulated transmission signal into a radio wave, into a detection area.

The receiving antenna 50 has the antenna elements 51 to 55. Each of the antenna elements 51 to 55 may be a patch antenna which includes a plurality of patch electrodes linearly disposed on a dielectric substrate at regular intervals. The direction in which the antenna elements 51 to 55 are disposed is perpendicular to a direction extending toward an area in front of a vehicle in which the radar apparatus is mounted (hereinafter referred to as the front direction of the radar apparatus, in which "direction of" is used in a similar manner hereinafter) and along the horizontal direction. More specifically, in this embodiment, the antenna elements 51, 52, 53, 54, and 55 are arranged in sequence from the right to the left as viewed from the front of the radar apparatus.

Figure 2:
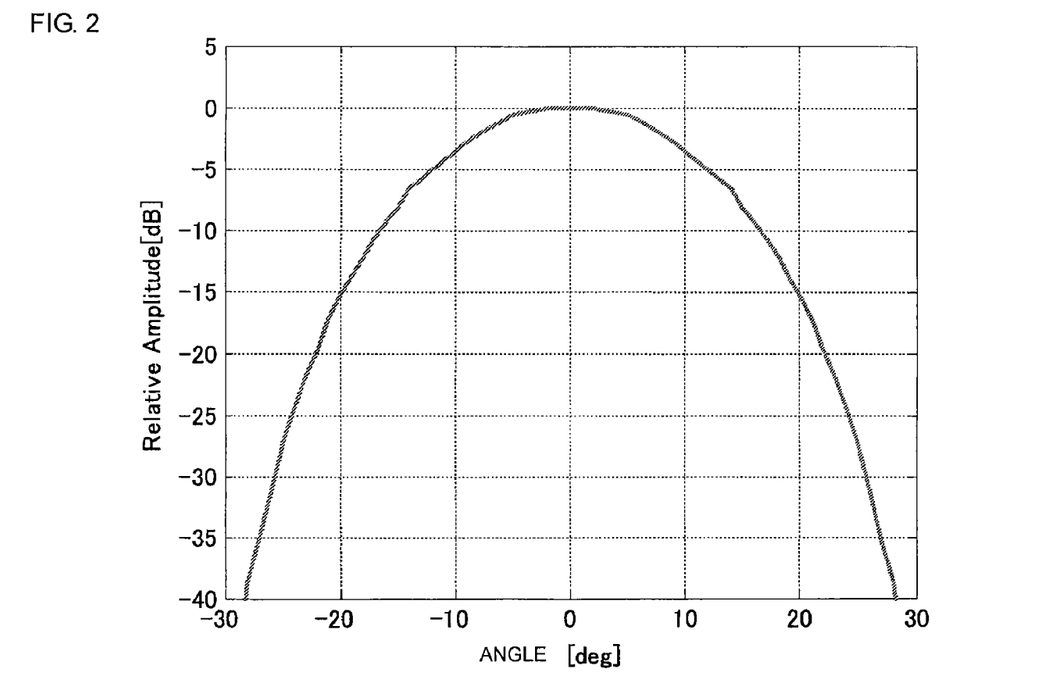
FIG. 2 illustrates an example of an antenna directivity pattern.

A directivity pattern produced by the combination of the transmitting antenna 40 and the receiving antenna 50 is set beforehand as illustrated in FIG. 2.

FIG. 2 illustrates an example of an antenna directivity pattern.

In this embodiment, the radar apparatus has a predetermined antenna pattern as illustrated in FIG. 2. For example, the front direction (direction perpendicular to an antenna transmission plane and extending towards a detection area) of each of the transmitting antenna 40 and the receiving antenna 50 is set to be 0 degrees (see FIG. 1). In the radar apparatus, the directional signal intensity is maximized at around 0 degrees. Hereinafter a directional signal intensity is simply referred to as a directional level. In the receiving antenna 50, angles towards the direction of antenna element 51 with respect to the front direction of the antenna element 53 (0-degree direction) are set as negative angles, and antenna element 51 is located an angle of about −90 degrees with respect to the front direction of the antenna element 53. The directional level of the radar apparatus decreases with decreasing angle in the −90-degree direction. In the receiving antenna 50, angles towards the direction of the antenna element 55 with respect to the front direction of the antenna element 53 (0-degree direction) are set as positive angles, and the antenna element 55 is located at an angle of about +90 degrees with respect to the front direction of the antenna element 53. The directional level of the radar apparatus decreases with increasing angle in the +90-degree direction. In addition, the directional levels are set to yield a directivity curve which is substantially symmetric for positive and negative sides with respect to the axis directed along the front direction (0-degree direction). For example, the directional level corresponding to −45 degrees and the directional level corresponding to 45 degrees are set substantially equal to each other, and the directional level corresponding to −30 degrees and the directional level corresponding to 30 degrees are set substantially equal to each other.

Such a directivity pattern can be realized by setting the above directivity pattern in at least either the receiving antenna 50 composed of the antenna elements 51 to 55 or the transmitting antenna 40. The set directivity pattern is stored in the signal processor 1.

The antenna elements 51 to 55 of the receiving antenna 50 arranged at intervals equal to or longer than about one-half the wavelength of a transmission wave. This inter-element spacing increases azimuth resolution while allowing generation of grating lobes as will be described below.

Each of the antenna elements 51 to 55 of the receiving antenna 50 receives a reflection wave corresponding to a transmission wave, which is reflected from a target, so as to generate a reception signal and outputs the reception signal to the output switcher 23 of the RF module 2.

The output switcher 23, constituting the reception system of the RF module 2, receives a reception signal from each of the antenna elements 51 to 55. The output switcher 23 is supplied with the switching control signal described above to switch connection of the RF amplifier 24 to the individual antenna elements 51 to 55 on the basis of the switching control signal. That is, the reception signal is supplied to the RF amplifier 24 from any one of the antenna elements 51 to 55 selected on the basis of the switching control signal.

The RF amplifier 24 performs gain control on the received reception signal and output the gain-controlled RF signal to the mixer 25.

The mixer 25 multiplies the RF signal and the local signal supplied from the distributor 22 to generate an IF beat signal and supplies the IF beat signal to the IF amplifier 26. The IF amplifier 26 performs gain control on the IF beat signal and outputs the gain-controlled IF beat signal to an analogue to digital (A/D) converter 3.

The A/D converter 3 samples the amplified (gain-controlled) IF beat signal at a predetermined sampling cycle so as to convert the analog IF beat signal to a digital IF beat signal to be output to the signal processor 1.

A buffer memory 10, which constitutes the reception system of the signal processor 1, sequentially buffers input IF beat signals.

A Fourier transform processing section 11 includes a temporal Fourier transforming unit 111 and a beam forming unit 112. The temporal Fourier transforming unit 111 generates a frequency spectrum using a known FFT (fast Fourier transform) technique and supplies the frequency spectrum to a distance/relative velocity detecting unit 12. The beam forming unit 112 applies a known Beamformer method or Capon method to the frequency spectrum generated by the temporal Fourier transforming unit 111 to calculate an azimuth spectrum corresponding to reception signal intensities at arbitrary specified azimuth angles in a predetermined detection area. The beam forming unit 112 supplies the azimuth spectrum to an azimuth detecting unit 13.

The distance/relative velocity detecting unit 12 calculates a distance from the radar apparatus to a target and a relative velocity of the target with respect to the radar apparatus using known distance and relative velocity calculation processes based on FMCW techniques.

The azimuth detecting unit 13 calculates the azimuth of the target on the basis of the directivity pattern, which has been stored beforehand, and the azimuth spectrum provided by the beam forming unit 112 through a processing procedure which will be described below.

[Description of the Principles of Azimuth Detection]

The radar apparatus described above detects a target azimuth on the basis of principles which will be described below.

Figure 3:
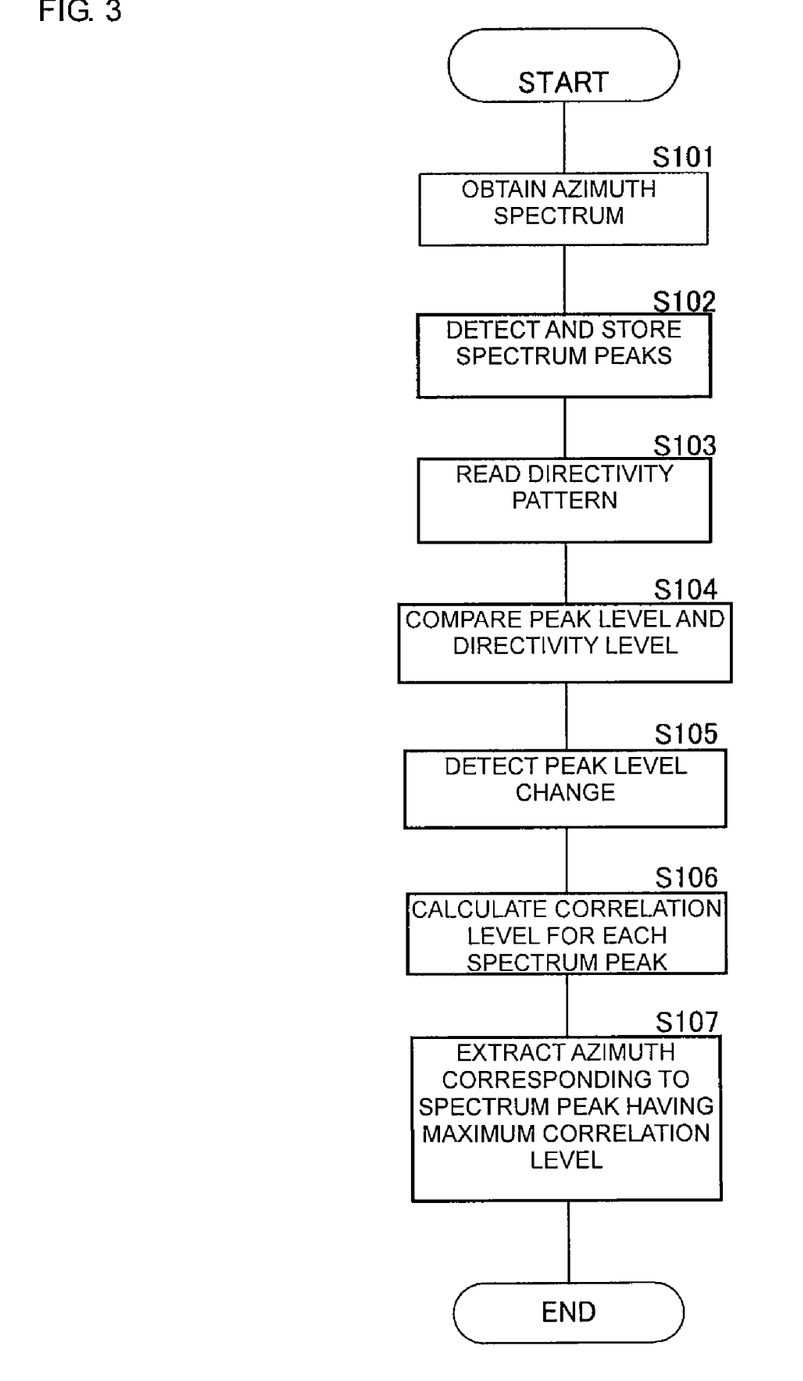
FIG. 3 is a flowchart illustrating a processing procedure of target azimuth detection according to an embodiment of the present invention.

FIG. 3 is a flowchart illustrating a processing procedure of target detection according to an embodiment of the present invention.

When the azimuth detecting unit 13 receives an azimuth spectrum (STEP S101), the azimuth detecting unit 13 sequentially stores the received spectrum for a predetermined time period. At this time, the azimuth detecting unit 13 need not store the entire azimuth spectrum. The azimuth detecting unit 13 detects spectrum peaks contained in the azimuth spectrum and sequentially stores the levels of the spectrum peaks and corresponding azimuths (STEP S102).

The azimuth detecting unit 13 reads a directivity pattern and obtains directional levels at the azimuths corresponding to the spectrum peaks (STEP S103).

The azimuth detecting unit 13 compares the peak levels of the detected spectrum peaks and the directional levels corresponding to the azimuths of the spectrum peaks so as to detect an azimuth at which the corresponding directional level is significantly low. The azimuth detecting unit 13 determines that the spectrum peak corresponding to the detected azimuth is due to grating lobes and excludes the spectrum peak from those to be obtained for the target detection processing (STEP S104).

The azimuth detecting unit 13 monitors the azimuth and change in spectrum peak level, for the spectrum peak of an azimuth whose corresponding directional level is relatively high (STEP S105).

At this time, the azimuth detecting unit 13 acquires a locus representing peak level change for each azimuth by approximating the peak level change with time by a predetermined approximation scheme. The approximation scheme may be linear approximation using the least squares method, approximation using a quadratic or higher order function, or the like. When linear approximation is employed, a locus of peak level change can be obtained rapidly because of simple arithmetic processing. On the other hand, when a quadratic or higher order function is employed, the locus of level change can be realized with increased precision, since approximation of the shape of a directivity pattern can be approximated with increased precision while the complexity of arithmetic processing increases.

The azimuth detecting unit 13 acquires an azimuth range in accordance with each locus representing the spectrum peak level change and calculates a locus representing a transition of directional levels corresponding to the azimuth range from the directivity pattern. For the calculation of the locus of directional levels, the same calculation scheme as used in the locus of the peak level change may be used. It is also possible to store beforehand loci for predetermined azimuth ranges and read a corresponding locus from the stored loci.

The azimuth detecting unit 13 calculates, for each of the acquired peak levels, a level of correlation between the acquired locus of peak level change and the corresponding locus of directional level in the directivity pattern. Specifically, for example, the azimuth detecting unit 13 obtains a correlation function between a function representing the peak-level-change locus and a function representing the directional-level locus and calculates the correlation level on the basis of the correlation function using a known method (STEP S106).

The azimuth detecting unit 13 compares the calculated correlation levels that have been obtained for the individual spectrum peaks and extracts an azimuth corresponding to the spectrum peak having the highest correlation level. The azimuth detecting unit 13 outputs the extracted azimuth as the target azimuth (STEP S107).

Figure 4:
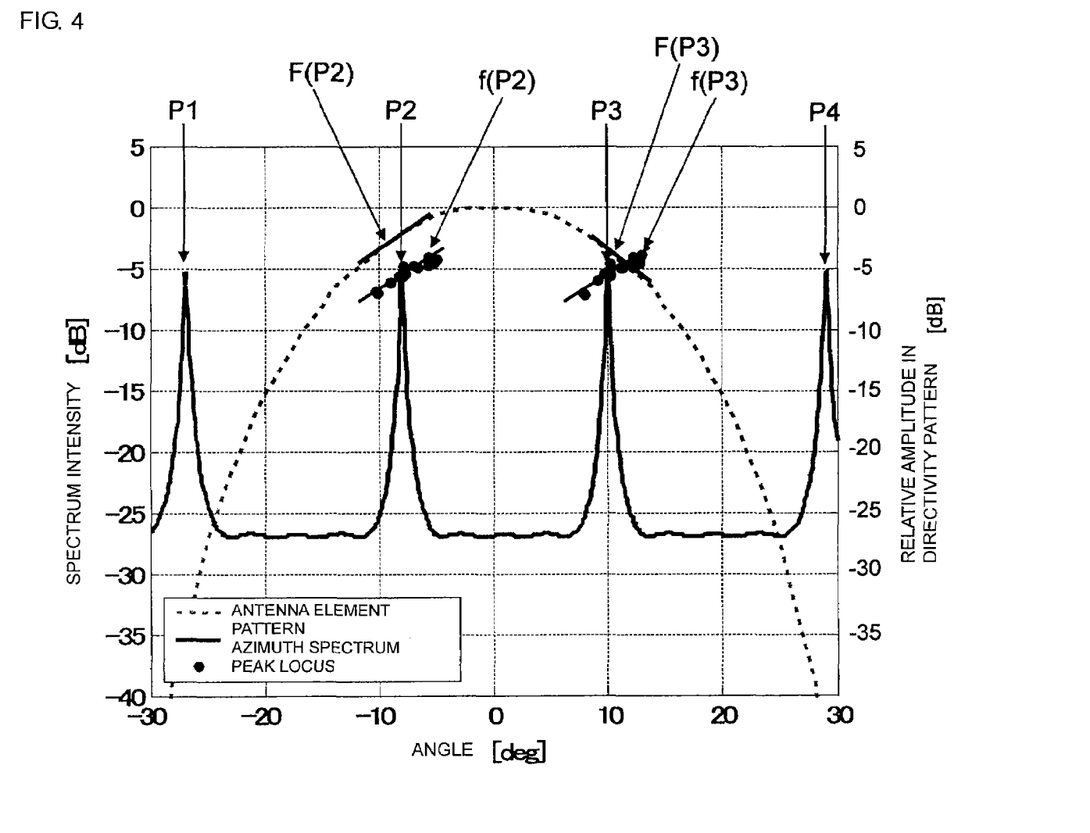
FIG. 4 illustrates a principle of target azimuth detection.

Referring now to FIG. 4, a processing procedure to be performed when spectrum peaks illustrated in the figure are obtained will be described. In the case of FIG. 4, a locus is calculated by linear approximation.

FIG. 4 is a graph for describing principles of target azimuth detection by illustrating a level of correlation between a locus of spectrum peaks in an azimuth spectrum and a directivity pattern.

For example, the azimuth detecting unit 13 detects azimuth angles −27 degrees, −8 degrees, +10 degrees, and +29 corresponding to spectrum peaks P1 to P4, respectively. At the same time, the azimuth detecting unit 13 detects that the values of the individual peak levels are all approximately −5 dB.

The azimuth detecting unit 13 detects directional levels in the directivity pattern which correspond to these azimuths of the spectrum peaks P1 to P4. Specifically, the azimuth detecting unit 13 detects that the directional levels corresponding to the spectrum peaks P1 to P4 are less than about −40 dB, about −3 dB, −4 dB, and less than about −40 dB, respectively. The azimuth detecting unit 13 determines that the spectrum peaks P1 and P4, whose corresponding directional levels are markedly low, are due to grating lobes and excludes the azimuths corresponding to the spectrum peaks P1 and P4 from candidates of the peak levels corresponding to the target azimuths.

Subsequently, the azimuth detecting unit 13 sequentially acquires the peak levels of the spectrum peaks P2 and P3 and corresponding azimuths at predetermined time intervals for a predetermined time period and stores change in the acquired peak levels and the corresponding azimuths in time. Then, the azimuth detecting unit 13 calculates linear functions f(P2) and f(P3) representing the loci of the peak level change of the spectrum peaks P2 and P3, respectively. These linear functions can be obtained by linear approximation.

The azimuth detecting unit 13 reads loci of a transition of directional levels in the directivity pattern which correspond to the azimuth ranges of the spectrum peaks P2 and P3, and respectively sets the loci as functions F(P2) and F(P3). The azimuth detecting unit 13 calculates a level of correlation between the linear function f(P2) relating to the peak level change of the spectrum peak P2 and the function F(P2) relating to the corresponding directional level transition. At the same time, the azimuth detecting unit 13 also calculates a correlation level between the linear function f(P3) relating to the peak level change of the spectrum peak P3 and the function F(P3) relating to the corresponding directional level transition. Note that as illustrated in FIG. 4, the linear function f(P2) and the function F(P2) are similar in locus, whereas the linear function f(P3) and the function F(P3) are not similar in locus as can be seen from their significantly different slope angles. This indicates that the correlation level relating to the spectrum peak P2 is higher than the correlation level relating to the spectrum peak P3. By applying this calculation result, the azimuth detecting unit 13 detects that the correlation level relating to the spectrum peak P2 is higher that that relating to the spectrum peak P3 and thus determines that the spectrum peak P2 corresponds to the azimuth of the target to be detected. The azimuth detecting unit 13 outputs the azimuth of −8 degrees corresponding to the spectrum peak P2 as the true azimuth of the target.

With the configuration and processing procedure described above, target azimuths can be calculated with precision and simplicity without complex arithmetic operations. In addition, precise azimuth detection can be realized even when grating lobes are present. This increases the degree of freedom in the setting of inter-element spacing of an array antenna. More specifically, it is possible to set inter-element spacing to be greater than approximately one-half wavelength of a transmission/reception signal. This realizes a large-aperture array antenna with a small number of antenna elements and thus a radar apparatus having a high azimuth resolution.

In the embodiment described above, a level of correlation between a locus of spectrum peak levels and a directivity pattern is calculated without taking into account a target distance. However, it is possible to correct the levels of spectrum peaks on the basis of a distance calculated by the distance/relative velocity detecting unit 12.

Figure 5:
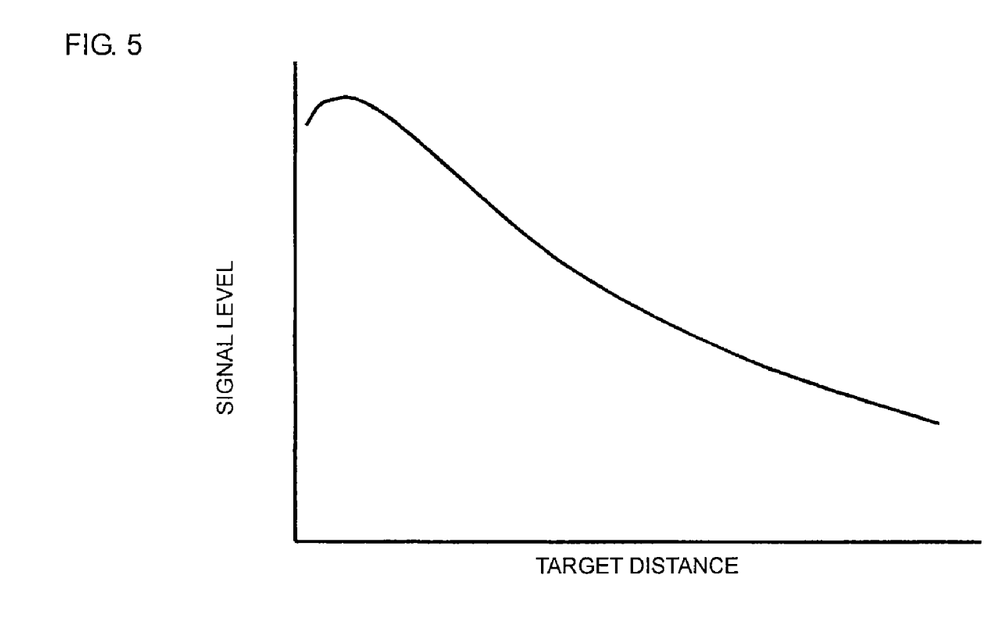
FIG. 5 illustrates the relationship between a distance between a radar to a target and a signal level of a wave reflected from a target.

FIG. 5 shows a profile of signal level of a reception wave reflected from a target versus distance from a radar to the target (target distance).

Since the relationship between the target distance and the reception signal level (reception signal intensity) can be uniformly obtained as illustrated in FIG. 5, the azimuth detecting unit 13 stores beforehand correction coefficients for signal levels corresponding to target distances. When a spectrum peak is obtained, the azimuth detecting unit 13 reads a correction coefficient on the basis of a target distance that is obtained at the same time and corrects the level of the spectrum peak using the read correction coefficient, so as to use the corrected peak level in the azimuth detection described above. With this arrangement, the azimuth detecting unit 13 acquires peak levels without being influenced by the target distance and thus detect the target azimuth with increased precision.

In the following, a radar apparatus and a radar target detection method for the radar apparatus according to a second embodiment of the present invention will be described with reference to the drawings.

Figure 6:
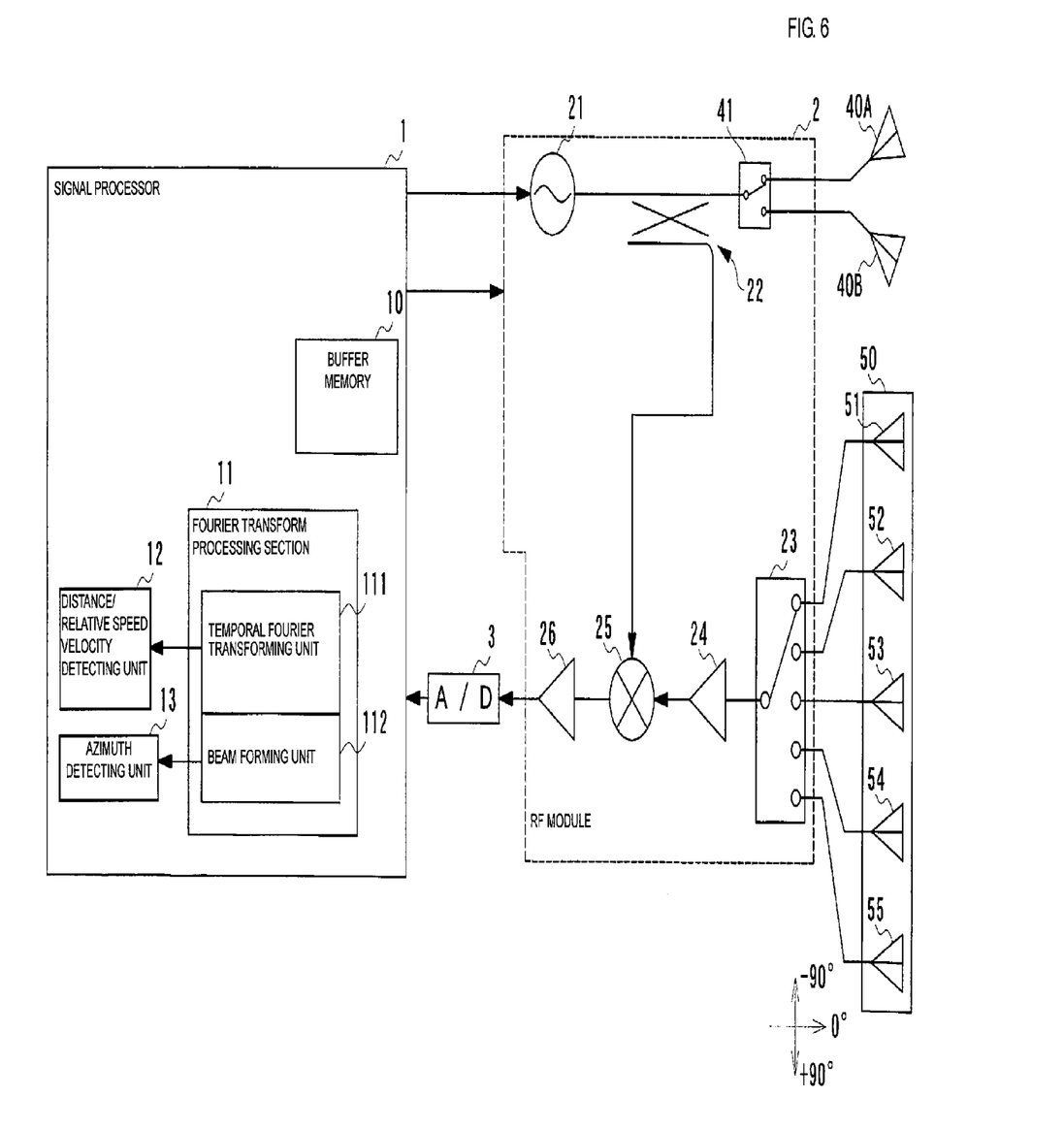
FIG. 6 is a block diagram schematically illustrating a configuration of an FMCW radar apparatus according to an embodiment of the present invention.

FIG. 6 is a block diagram illustrating a configuration of an FMCW radar apparatus according to an embodiment of the present invention.

Figure 7A:
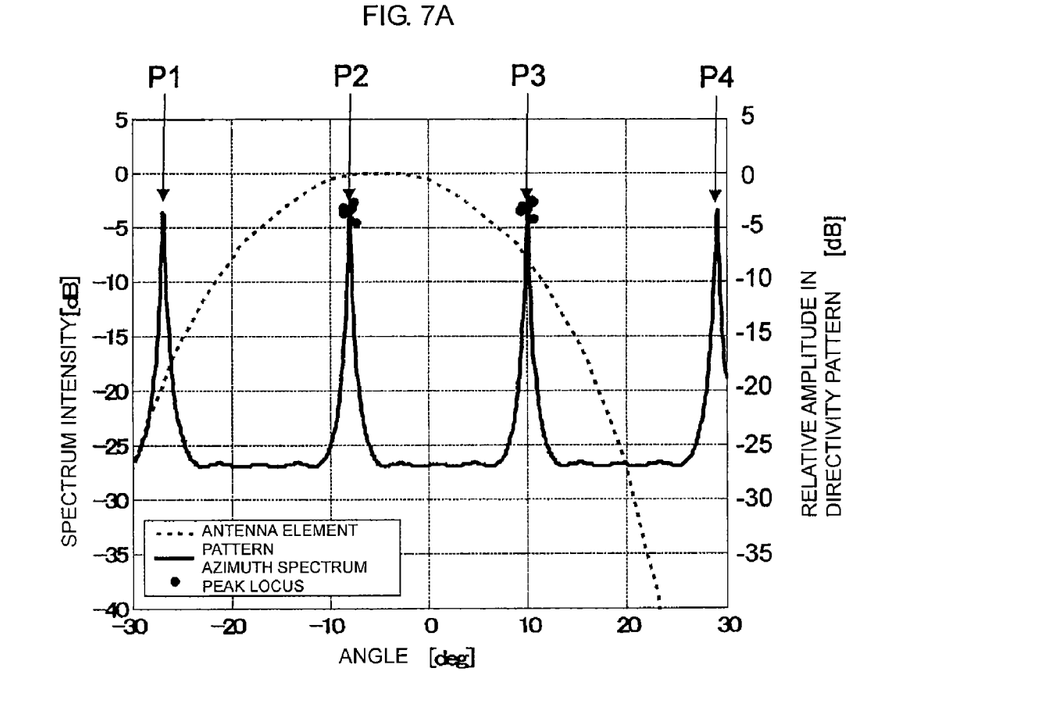
FIGS. 7A and 7B illustrate loci of spectrum peaks in azimuth spectra and directivity patterns.
Figure 7B:
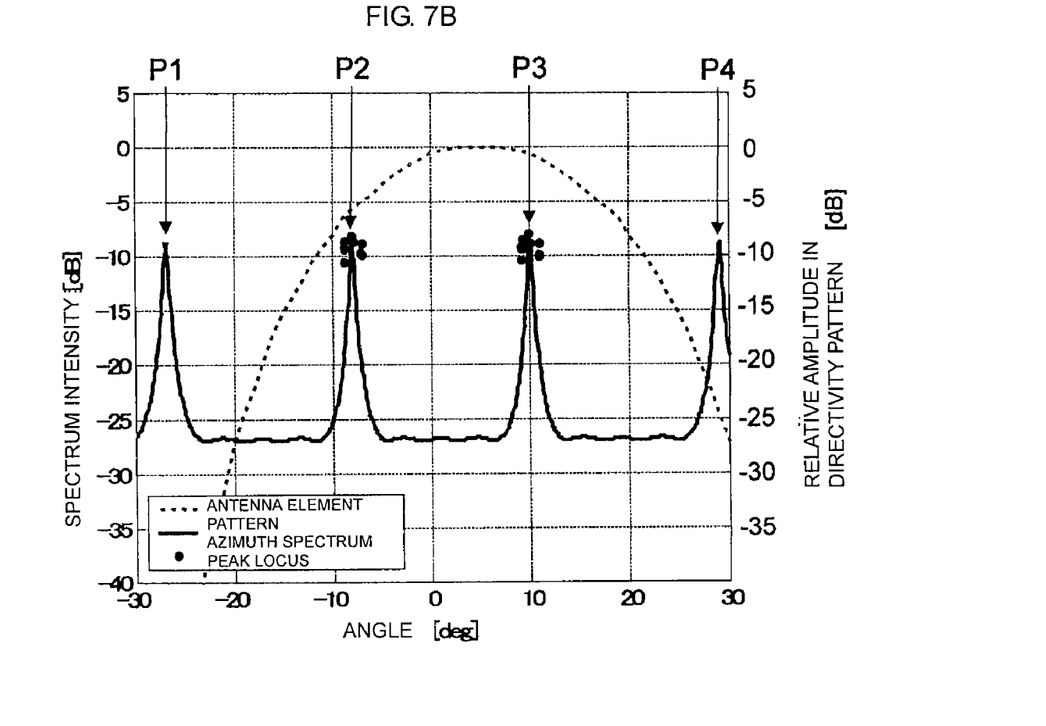

Each of FIGS. 7A and 7B illustrates a locus of spectrum peaks levels in an azimuth spectrum and a directivity pattern. FIG. 7A illustrates a locus of spectrum peaks and a directivity pattern obtained at a transmitting antenna 40A, and FIG. 7B illustrates a locus of spectrum peaks and a directivity pattern obtained at a transmitting antenna 40B.

As illustrated in FIG. 6, the radar apparatus in this embodiment has two transmitting antennas 40A and 40B, and a switch circuit 41 for switching between the transmitting antennas 40A and 40B. The radar apparatus according to this embodiment and the radar apparatus according to the first embodiment are different in transmitting antenna configuration, switching control, and azimuth detection operations of the azimuth detecting unit 13. The other configurations and operations of the radar apparatuses are similar to each other, and thus the description thereof will be omitted.

Each of the transmitting antennas 40A and 40B has the same configuration as the transmitting antenna described in the first embodiment. However, the azimuth angles of the front direction of the transmitting antennas 40A and 40B are set differently. For example, suppose the azimuth angle of the front direction of the radar apparatus is 0 degrees, the transmitting antenna 40A has a directivity pattern where the maximum directional level is obtained at −5 degrees as illustrated in FIG. 7A. Similarly, the transmitting antenna 40B has a directivity pattern where the maximum directional level is obtained at +5 degrees. The shapes of the directivity patterns of the transmitting antennas 40A and 40B, as well as the shape of the directivity pattern shown in FIG. 4, are substantially the same in that they have symmetric shapes with respect to the corresponding azimuth angles of maximum directional level, which are only different in value.

The switch circuit 41 selects either the transmitting antenna 40A or the transmitting antenna 40B on the basis of a switching control signal supplied from the signal processor 1 and connects the selected transmitting antenna to the distributor 22. The timing of switching is generated for every measurement phase described in the first embodiment. Specifically, the switch circuit 41 switches between the transmitting antennas 40A and 40B, such that transmission/reception using the transmitting antenna 40A and the antenna elements 51 to 55 of the receiving antenna 50 and transmission/reception using the transmitting antenna 40B and the antenna elements 51 to 55 of the receiving antenna 50 are alternately repeated.

The azimuth detecting unit 13 of the signal processing unit 1 detects spectrum peaks for each of the transmitting antennas 40A and 40B and acquires a peak level of each of the detected spectrum peaks. Note that a peak level of a spectrum peak is proportional to a transmission/reception signal level, i.e., directional level, at a corresponding azimuth. Thus, the peak level of a spectrum peak at an azimuth of a high directional level is high, whereas the peak level of a spectrum peak at an azimuth of a low directional level is low.

Using the above principle, in this embodiment, the azimuth detecting unit 13 detects level change of each spectrum peak which is caused by switching of the transmitting antennas 40A and 40B. When a peak level decreases as a result of switching, the azimuth detecting unit 13 determines that a target is located at an azimuth of which the corresponding directional level in a directivity pattern before the switching is high and decreases after the switching. For example, FIG. 7A shows peak levels that are high when the directional level is maximum at an azimuth of −5 degrees, and FIG. 7B shows peak levels that are low when the directional level is maximum at an azimuth of +5 degrees. This indicates that the target azimuth is the azimuth corresponding to a spectrum peak of which the spectrum peak level before the switching is close to a spectrum peak level corresponding to the azimuth of −5 degrees yielding the maximum directional level and of which the spectrum peak level after the switching is far from a spectrum peak level corresponding to the azimuth of +5 degrees yielding the maximum directional level.

Thus, the azimuth detecting unit 13 selects the spectrum peak P2, whose corresponding azimuth is −8 degree, from among the candidate spectrum peaks P2 (corresponding azimuth is −8 degrees) and P3 (corresponding azimuth is +10 degrees), since the azimuth (−8 degrees) corresponding spectrum peak P2 is close to the azimuth of −5 degrees and far from the azimuth of +5 degree. Then the azimuth detecting unit 13 outputs the azimuth of +8 degrees as the target azimuth. As mentioned above, the spectrum peaks P1 and P4, whose corresponding directional levels are markedly low, are excluded from the candidate spectrum peaks.

With the above configuration and operations, an azimuth of a target can be detected with precision even when no change occurs in the target azimuth.

Also in this embodiment, the target azimuth can be detected with increased precision by performing correction of peak levels on the basis of a target distance.

While the number of transmitting antennas applied in this embodiment is two, three or more transmitting antennas having different azimuths of maximum directional levels may be set.

Moreover, in the method according to this embodiment, a target azimuth is detected on the basis of the level change of peak levels before and after switching of the transmitting antennas. However, in addition to this method the method described in the first embodiment may also be employed. With this arrangement, target azimuth detection can be preformed with increased precision on the basis of two types of peak level change.

Furthermore, operation principles described above are utilized so that peak level change at an azimuth corresponding to a spectrum peak, which occur when a plurality of antenna directivity patterns are changed, is time-sequentially detected and approximated with a predetermined function so that a level of correlation between the peak level change and the corresponding directivity pattern is calculated.

While preferred embodiments of the invention have been described above, it is to be understood that variations and modifications will be apparent to those skilled in the art without departing the scope and spirit of the invention. The scope of the invention, therefore, is to be determined solely by the following claims.

What is claimed is:

1. A radar target detection method comprising:
   obtaining reception signals by transmitting and receiving waves through antenna elements of an array antenna;
   calculating reception signal intensities at arbitrary specified azimuth angles in a predetermined detection area;
   detecting a level change of spectrum peaks in an azimuth spectrum of the reception signal intensities;
   calculating a level of correlation between the level change of each spectrum peak and a directivity pattern of the array antenna in an azimuth range corresponding to that spectrum peak; and
   determining an azimuth corresponding to the spectrum peak having the highest corresponding correlation level to be the azimuth at which a target is located.

2. The radar target detection method of claim 1,
   wherein when the azimuth corresponding to the spectrum peak changes with time, a change in a spectrum peak level according to the azimuth change is detected, and the detected spectrum peak level change is approximated using a predetermined function so that the level of correlation between the spectrum peak level change and the directivity pattern is calculated.

3. The radar target detection method of claim 2,
   wherein the spectrum peak level change is linearly approximated.

4. The radar target detection method of claim 1, further comprising:
   correcting the level change of the spectrum peaks on the basis of distances calculated from the reception signals.

5. The radar target detection method of claim 1, further comprising:
   setting a plurality of directivity patterns; and
   calculating a level of correlation between a change in a directional level due to switching between the plurality of directivity patterns and a change in the spectrum peak level due to the switching for each azimuth corresponding to an individual spectrum peak.

6. A radar apparatus comprising:
   a transmitting antenna and a receiving antenna, at least either of which is an array antenna composed of a plurality of antenna elements disposed linearly at a predetermined spacing; and
   a target detecting unit configured to:
   obtain reception signals by transmitting and receiving waves through the antenna elements of the array antenna;
   calculate reception signal intensities at arbitrary specified azimuth angles in a predetermined detection area;
   detect a level change of spectrum peaks in an azimuth spectrum of the reception signal intensities;
   calculate a level of correlation between the level change of each spectrum peak and a directivity pattern of the array antenna in an azimuth range corresponding to that spectrum peak; and
   determine an azimuth corresponding to the spectrum peak having the highest corresponding correlation level to be the azimuth at which a target is located.

7. The radar apparatus of claim 6,
   wherein the antenna elements are disposed with a spacing of at least one half wavelength of a transmission signal.

8. The radar apparatus of claim 6, further comprising a switching unit configured to switch a front direction of the array antenna.

9. The radar apparatus of claim 8, wherein the switching unit is a mechanical switch.

* * * * *